United States Patent [19]

Lederman

[11] Patent Number: 4,979,698
[45] Date of Patent: Dec. 25, 1990

[54] ROTOR SYSTEM FOR WINGED AIRCRAFT

[76] Inventor: Paul Lederman, 18 Wheatley Close, Hendon, London NW4 4LG, England

[21] Appl. No.: 378,273

[22] Filed: Jul. 11, 1989

Related U.S. Application Data

[63] Continuation-in-part of Ser. No. 216,083, Jul. 7, 1988, abandoned.

[51] Int. Cl.⁵ ............................................. B64C 29/00
[52] U.S. Cl. ...................................... 244/7 R; 244/8; 244/17.13; 244/66; 416/142
[58] Field of Search .................. 244/7 R, 7 A, 7 B, 8, 244/17.11, 17.13, 36, 2, 56, 66; D12/335, 336, 326, 327, 328; 416/142, 143, 148

[56] References Cited

U.S. PATENT DOCUMENTS

| | | | |
|---|---|---|---|
| 2,198,941 | 4/1940 | Jacobs | 244/8 |
| 2,224,641 | 12/1940 | Burnelli | 244/36 |
| 3,149,800 | 9/1964 | Sintos et al. | 244/7 R |
| 3,404,852 | 10/1968 | Sarnkell et al. | 244/7 A |
| 3,627,234 | 12/1971 | Dziallas | 244/7 A |
| 3,797,783 | 3/1974 | Kisovec | 244/7 A |
| 4,059,247 | 11/1977 | Prewitt | 244/8 |

FOREIGN PATENT DOCUMENTS 685072 11/1939 Fed. Rep. of Germany .......... 244/8

Primary Examiner—Galen Barefoot
Attorney, Agent, or Firm—Joseph S. Iandiorio; Brian M. Dingman

[57] ABSTRACT

A rotor system for a rotor convertible fixed winged aircraft comprising a rotatable rotor shaft mounted on one of the wings of the aircraft, the shaft tiltable between a substantially vertical position and a substantially horizontal position, a rotor mounted to the shaft and including at least one blade, the blade having an adjustable blade angle relative to the shaft, apparatus for tilting the shaft between the vertical and horizontal positions, controls responsive to the tilting of the shaft for automatically adjusting the blade angle of a blade to an autogyro blade angle when the shaft is in the vertical position and to a substantially feathered blade angle when the shaft is in the horizontal position.

21 Claims, 10 Drawing Sheets

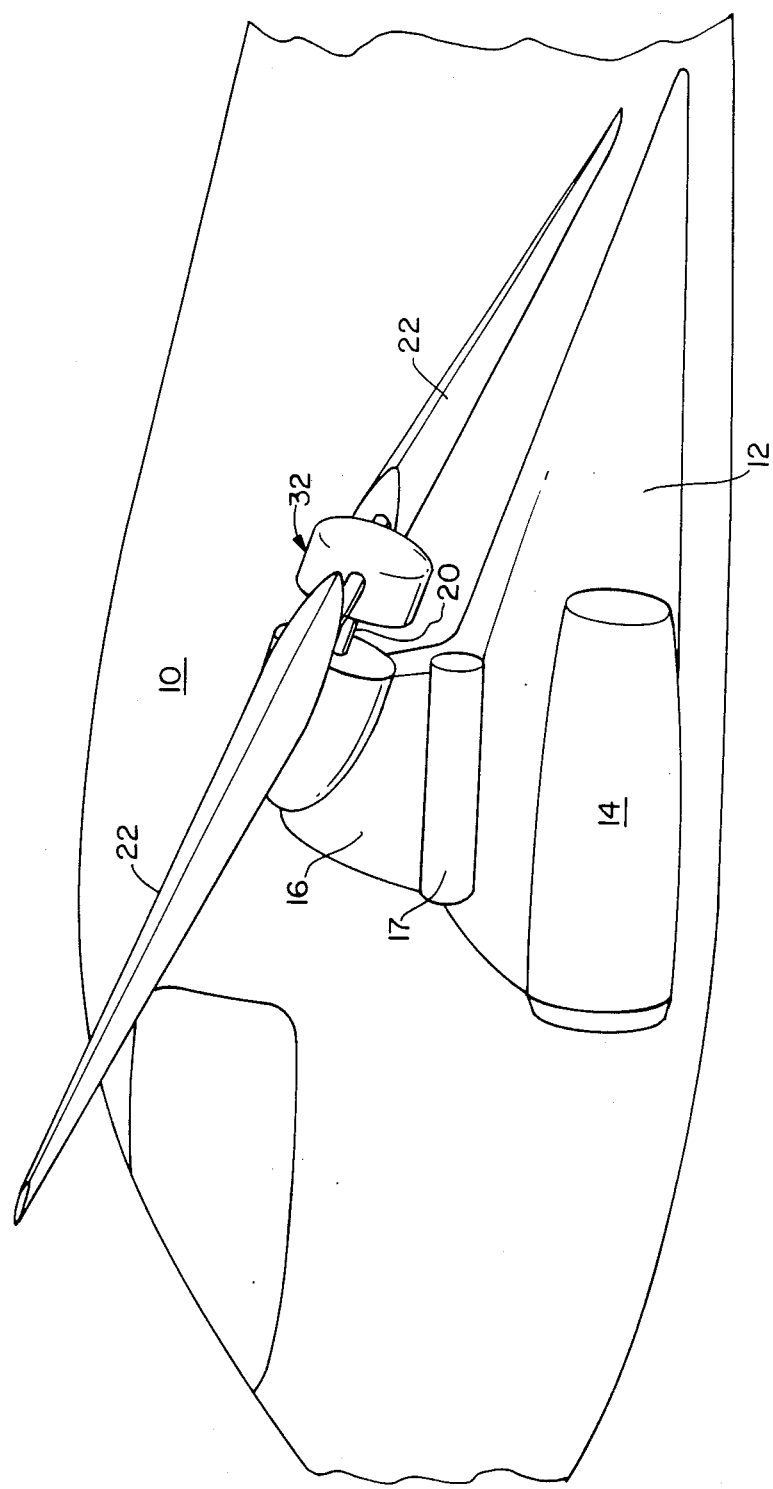

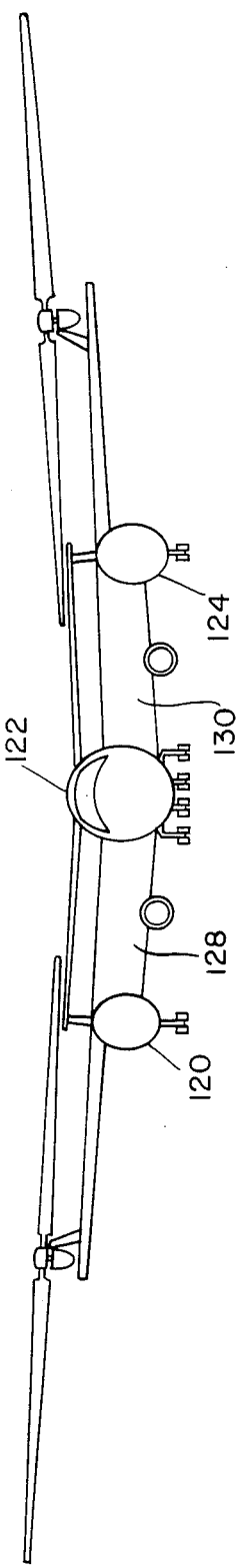

ROTOR SYSTEM FOR WINGED AIRCRAFT

RELATED CASE

This application is a continuation-in-part of U.S. patent application Ser. No. 07/216,083, filed July 7, 1988, entitled IMPROVEMENTS IN AIRCRAFT now abandoned.

FIELD OF INVENTION

This invention relates to an improved rotor system for rotor convertible winged aircraft and more particularly to such a system in which the rotors are stowed behind the fixed wings and feathered to provide added lift while the aircraft is wing borne.

BACKGROUND OF INVENTION

Several approaches to combine the benefits of vertical or short takeoff and landing like that offered by a conventional helicopter with cruising performance superior to that of a conventional helicopter have been tried in the prior art. One approach produced tilt rotor designs such as the Bell/Bowing Osprey and Eurofan. In these designs, the aircraft take off and land as helicopters through the use of driven rotors and cruise as airplanes by tilting the rotors so that their axis of rotation is horizontal and the rotors provide thrust instead of lift. These aircraft can thus exceed cruising speed of conventional helicopters but cannot exceed the cruising speeds of other turboprop aircraft. One way to overcome this limitation is to provide a tiltable rotor aircraft with jet propulsion and somehow stow the rotors during wing borne, jet propelled flight. Prior art aircraft of this type, however, have suffered drawbacks in that the rotors are driven and therefore require complicated machinery which adds weight to the aircraft and, when stowed during wingborne cruising flight, cause excess drag and change the center of gravity of the aircraft.

SUMMARY OF INVENTION

It is therefore an object of this invention to provide a rotor convertible winged aircraft which can attain superior cruising speeds.

It is a further object of this invention to provide such an aircraft which provides the economy of conventional jet aircraft.

It is a further object of this invention to provide such an aircraft which is substantially reduced in weight.

It is a further object of this invention to provide such an aircraft in which the rotor system is mechanically uncomplicated and easy to manufacture.

It is a further object of this invention to provide such an aircraft which allows for very short takeoff and landing capabilities.

It is a further object of this invention to provide such an aircraft in which the rotor generates lift at cruising speeds.

It is a further object of this invention to provide such an aircraft in which the pitch of the rotor blades is automatically adjusted as the rotor is tilted.

This invention results from the realization that a truly efficient tilt rotor aircraft may be produced by tiltably mounting a rotor on the wings of the aircraft with the rotor including blades with adjustable pitch, the pitch automatically adjusting to provide thrust during takeoff and landing when the rotor is in the vertical position and to obtain aerodynamic lift when the rotor is stowed in the horizontal position during wing-borne flight.

This invention features a rotor system on a fixed wing jet propelled aircraft contributing to lift during takeoff and flight. The rotor system includes a rotatable rotor shaft mounted on one of the wings of the aircraft; the shaft is tiltable between a substantially vertical position and a substantially horizontal position. The rotor includes at least one blade mounted on the shaft. The blade having an adjustable blade angle relative to the shaft. There are means for tilting the shaft between the vertical and horizontal positions and means responsive to the tilting of the shaft for adjusting the blade angle of the blade to an autogyro blade angle when the shaft is in a vertical position and to a substantially feathered blade angle when the shaft is in the horizontal position.

In a preferred embodiment, the shaft may be mounted near the center of lift of the wing of the aircraft. The system may include means for differentially adjusting the said blade angle independent of the tilting of the shaft. This system may also include means for rotating the shaft before takeoff to energize the rotor and means for inhibiting rotation when the shaft is in the horizontal position. This invention may be used on an aircraft having substantially vertical winglets attached to the distal ends of the wings of the aircraft. The winglets being angled upward from the wings. The rotor may include at least two blades, each blade is at least slightly less than the length of the wing on which it is mounted. In another embodiment, the rotor system according to this invention may be mounted on each of the wings of an aircraft and may include means for synchronizing the tilting of the rotor shaft. The rotors may be paired and may counterrotate with outboard or mutually distal blades advancing. The invention also includes an aircraft having more than one fuselage linked by a wing structure providing lift wherein the fuselages and wing structure house either passenger seating or freight stowage or both and the rotor system according to this invention is installed on the wing structure.

DISCLOSURE OF PREFERRED EMBODIMENT

Other objects, features and advantages will occur to those skilled in the art from the following description of a preferred embodiment and the accompanying drawings, in which:

FIG. 5 is a perspective side view of the left wing of the aircraft of FIG. 4;

FIG. 13 is a front plan view of the aircraft of FIG. 11.

This invention may be accomplished by a rotor system on a jet propelled aircraft. The rotor system may include one or more rotors mounted on shafts which are tiltably mounted on the wings of the aircraft. The shafts may tilt between a substantially vertical position and a substantially horizontal position. The rotors include blades oriented at a angle to the shaft of the rotors and the blade angle may be adjustable in accordance with the degree of tilt. The rotors are undriven and therefore in the vertical position act as autogyros with the aircraft flying in an autogyro mode. When in the horizontal position the blade angle of the blades may be adjusted to substantially feather the blades in a position above and behind the wings of the aircraft. In this position the blades are stowed so that wingborne flight at higher cruising speeds may be attained and the blades may achieve aerodynamic lift which will at least counteract their weight, to result in a floating condition. During the transition from the vertical position or autogyro mode to the horizontal position or wingborne flight the blade angle of the blades may be adjusted automatically to minimize drag and maintain lift. When conversion from autogyro mode to wingborne mode is complete the rotation of the rotor is inhibited and the blades are stowed in the horizontal position for aerodynamic lift.

Figure 1:
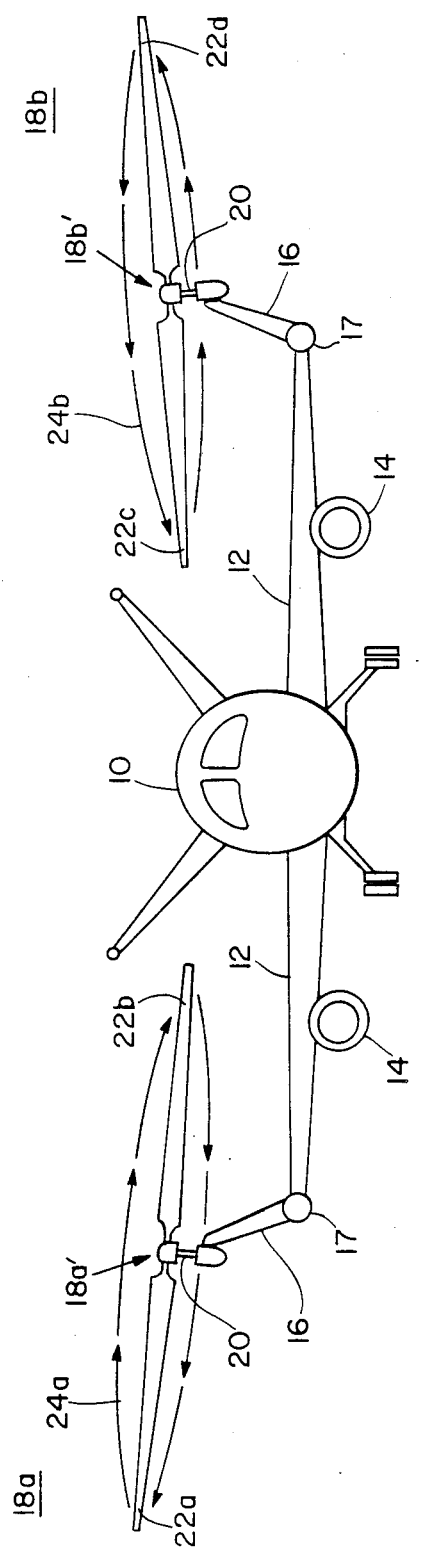
FIG. 1 is a front plan view of a fixed wing jet propelled aircraft having a rotor system according to this invention mounted on its wings.

There is shown in FIG. 1 a fixed winged jet propelled aircraft having fuselage 10 and fixed wings 12 on opposite sides of fuselage 10. The aircraft is propelled by fan jets 14. At the end of wings 12 are winglets 16 is respectively which are canted upwards at an angle of about 70° to the horizontal. At the upper part of each winglet 16 are mounted rotor systems 18a, 18b according to this invention. Rotor systems 18a, 18b include shafts 20 which are tiltable and are shown in a vertical position and rotors 18a', 18b' with blades 22a, 22b, 22c and 22d which, in rotation about shafts 20, define rotator disk loci 24a, 24b, respectively. The shafts 20 are undriven during flight and therefore act as autogyros when in the vertical position. Shafts 20 are tiltable between the vertical position shown and a horizontal position to be described later. Rotor shafts 20 may be canted slightly inwards towards fuselage 10 when in autogyro mode so that the rotor disk loci are slightly inclined inwards to enhance lateral stability in a way similar to the effect of the dihedral angle with fixed wings. Winglets 16 provide good vertical clearance for blades 22 from wings 12, resulting in high clearance of rotor disks 24 over wings 12 and yielding superior stability without the need for a long rotor shaft. The vertical clearance of a rotor disc from wing 12 also ensures that wing 12 does not mask the airflow to rotor system 18a, 18b when the aircraft is in autogyro mode. Winglets 16 are stiffened to bear the loads of rotor systems 18a, 18b and serve structurally as supports for rotors 18 in addition to serving aerodynamic functions. The tips of wings 12 may include tip tank assemblies 17a, 17b as well as winglets 16.

Tip tanks structures 17 may also serve to reinforce the wing tip winglet attachment. The aircraft may be powered by conventional twin fan jets 14 mounted at midwing. With the jets so positioned, the center of gravity of the aircraft is moved forward giving more tail leverage, and therefore allowing for a smaller tail. Further, the airflow into the engines is unaffected by wing or fuselage. The midwing position is dictated by the stress of the autogyro mode when the wing bears maximum bending loads. By locating the engines under the wing instead of on the fuselage, there is some bending relief. Furthermore, unlike conventional executive jets, there is no need for a clear wing for takeoff and landing performance. The asymmetric power condition is not a problem in fixed wing mode as there is ample rudder leverage and in autogyro mode the wide rotor pair should give adequate yaw control by differential collective pitch application. An additional safety feature is that after a total loss of power, emergency autogyro descent is possible as with other rotor craft.

Figure 2:
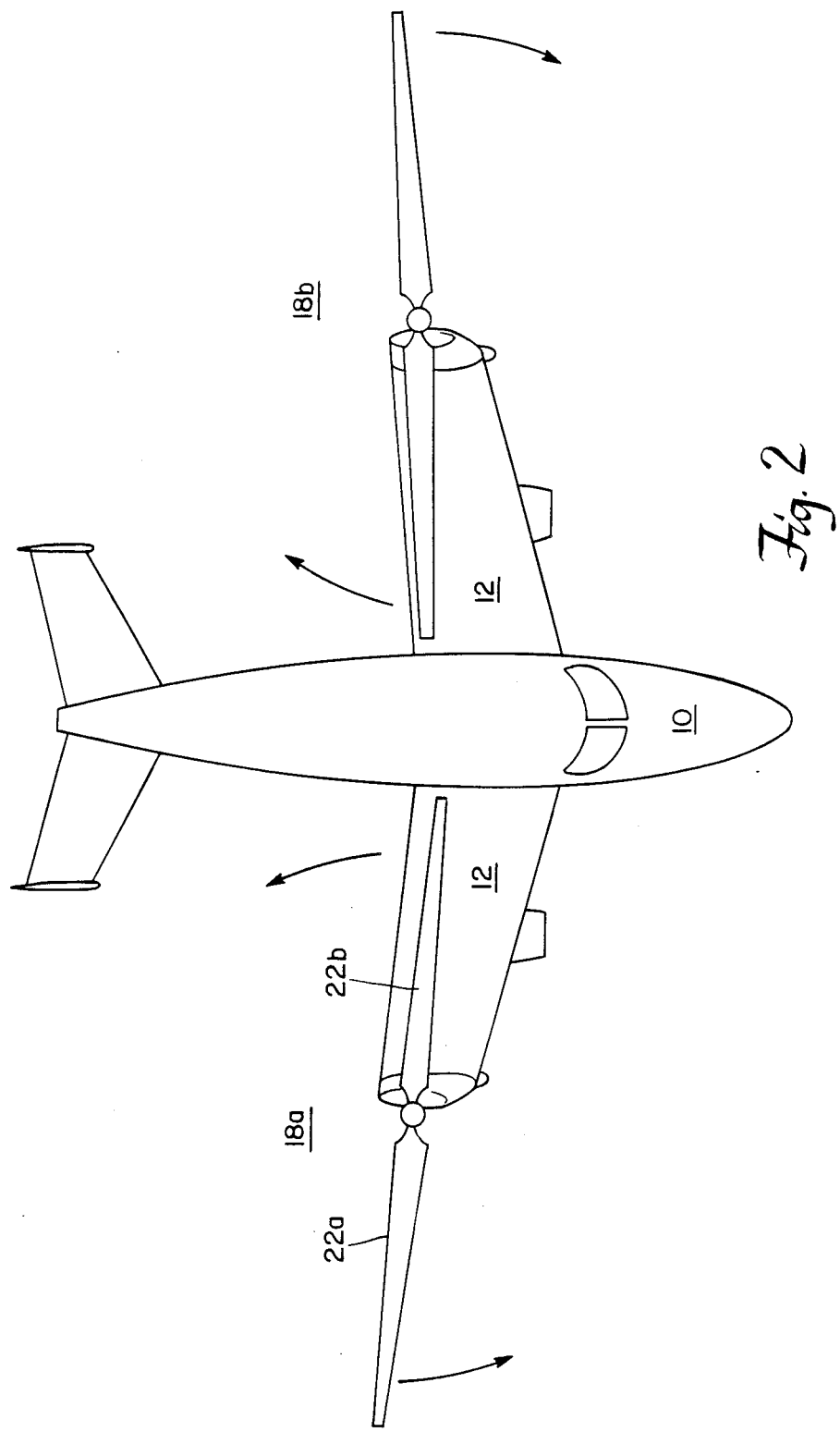
FIG. 2 is a top plan view of the aircraft of FIG. 1 showing the rotors in counter rotation with distal blades advancing.

FIG. 2 shows rotor systems 18a, 18b in counter rotation in the direction of the arrows for maximum balance with the advancing blades outboard. The rotation of the rotor shafts should be permanently synchronized. The bearing about which rotor shaft tilts is located on the leading edge of the winglet tip. Therefore, when the shaft is in the vertical position for autogyro mode, rotor lift is nearly in line with the center of lift of the wing. The resulting downward pitch is balanced by the greater couple between the low thrust line and the much higher drive line of the rotors compared with that of the fixed wing. When in autogyro mode, the pitch or blade angle relative to the shaft is given an auto rotating incidence.

Figure 3:
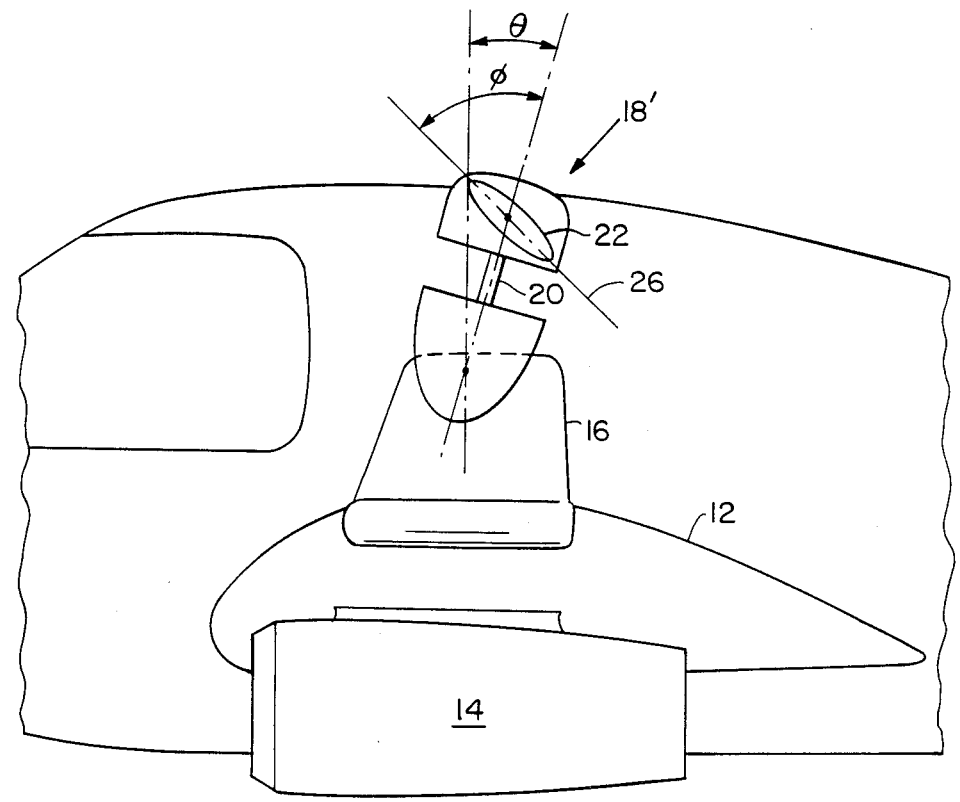
FIG. 3 is a side plan view of the aircraft of FIG. 2 showing the cross sectional shape of the blades on the rotor.

FIG. 3 shows shaft 20 in the vertical position, in which it is inclined slightly rearward to prepare for takeoff or relatively slow forward motion. Blade 22 is shown in cross section to be symmetric about cross sectional axis 26 and to be adjusted to have blade angle $\phi$ with respect to shaft 20. With shaft 20 at vertical angle $\theta$ and blade 22 having blade angle $\phi$ rotor 18' rotates in the manner of an autogyro rotor and thus provides considerable lift.

Figure 6:
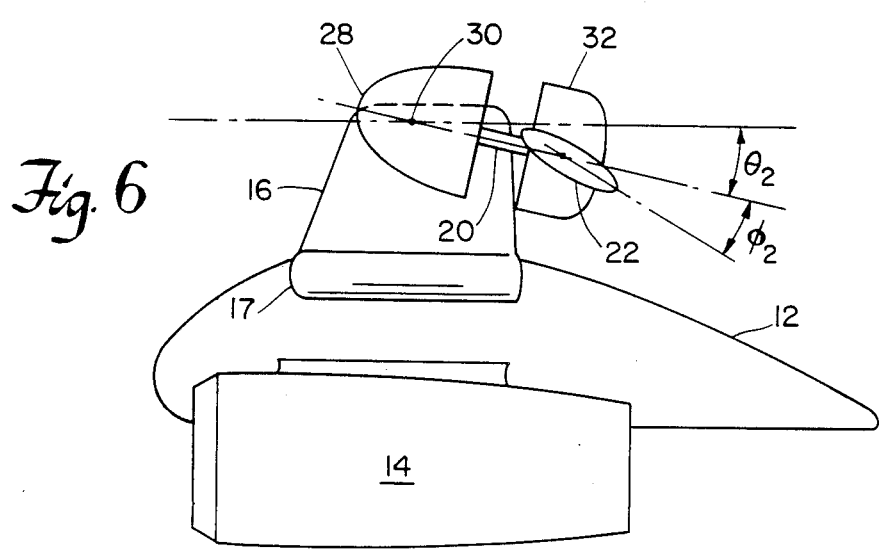
FIG. 6 is a side plan view of the wing of FIG. 5 showing the tilt of the shaft and the change in blade angle of the rotor blade.
Figure 4:
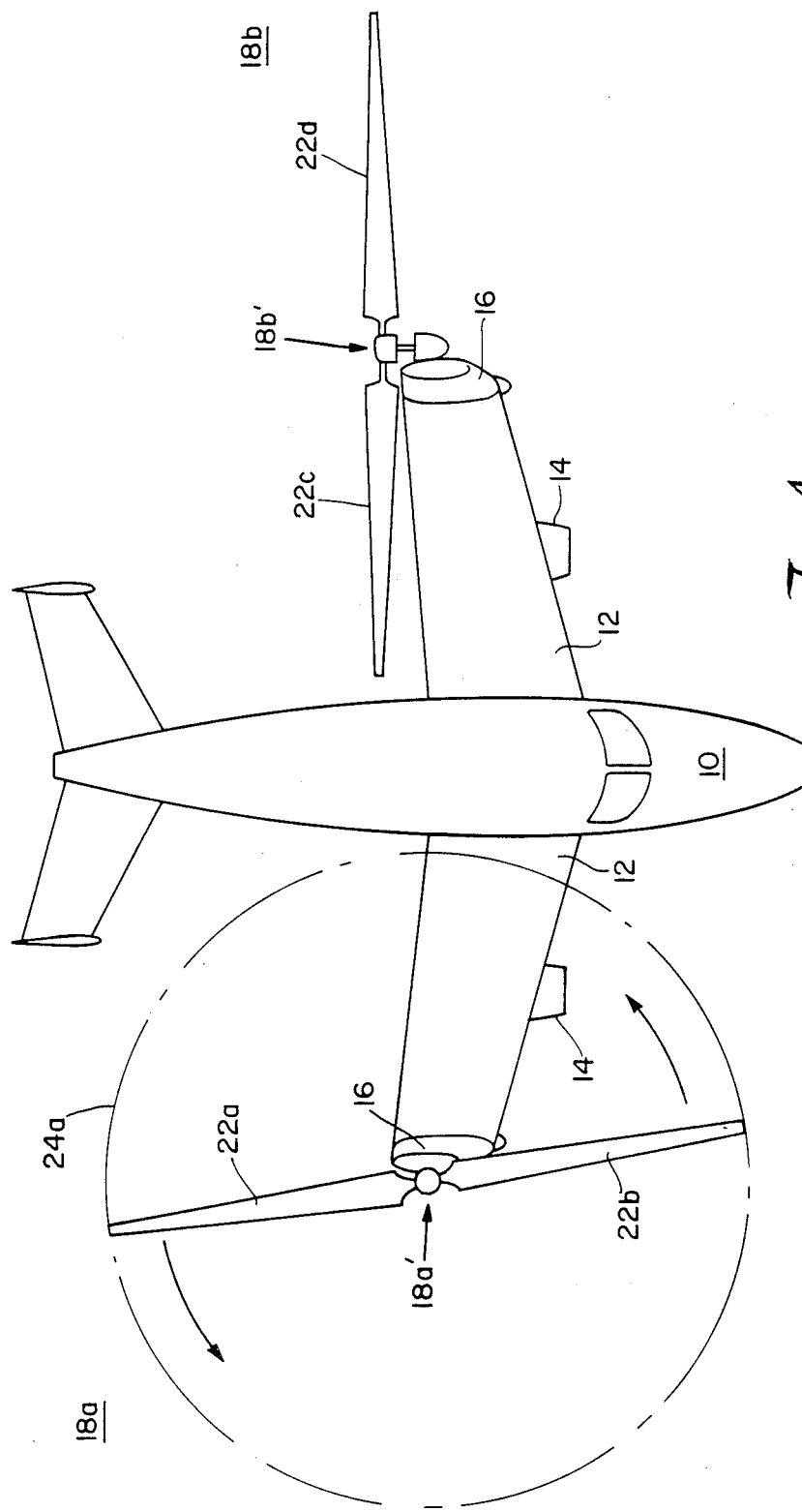
FIG. 4 is a top plan view of the aircraft of FIG. 2 with the rotor on the left wing tilted to a horizontal position while the rotor on the right wing is shown in a vertical position for comparison while ordinarily both rotors are tilted simultaneously.

FIG. 4 shows rotor system 18b on wing 12b tilted to a horizontal position. Ordinarily rotor system 18a and 18b are tilted simultaneously but FIG. 4 shows rotor system 18a and rotor disk 24a defined by blades 22a and 22b in the vertical position for comparison. When fixed in the horizontal position blades and 22d and 22c do not define a rotor disk because they do not rotate, rotation of rotor 18b' having been inhibited by a braking mechanism as will be described below. Since rotors 18a', 18b' are mounted on the ends of wings 12, blades 22a, 22b, 22c and 22d may have any length which will not allow them to contact fuselage 10 and therefore may be almost as long as wings 12. When in the horizontal position, blades 22 are substantially aligned with wing 12 as shown in FIG. 5. When in this horizontal position blade angle $\phi$ has been adjusted to $\phi2$, FIG. 6, so that blade 22 attains aerodynamic lift during forward motion. The position of shaft 20 is slightly below the horizontal at angle $\theta2$ so that bullet nose 28 may also provide lift. In this horizontal position blades 22 are substantially feathered so that their respective leading edges face forward and blades 22 act as small fixed wings with the rotor coning angle becoming wing sweep so that blades 22 float efficiently in the high speed airflow during wing borne flight. This orientation reduces drag, enhances lift of the aircraft and obviates the need to fold or encase blades 22 at cruising speeds. When more than one rotor system is used on an aircraft, the rotation and tilting of shafts 20 from the vertical to the horizontal position may be synchronized.

Shaft 20 may extend somewhat beyond tilt axis 30 to accommodate some mass balancing and to form an efficient bullet nose upstream when shaft 20 is in the horizontal position. This does not interfere with winglet structure 16 when shaft 20 is in the vertical position because winglet 16 is canted from the vertical and the bullet nose 28 therefore simply drops beside winglet 16 when vertical. Winglet 16 provides good vertical clearance for blades 22 when in the horizontal mode. In this position shaft 20 is not truly horizontal but is fixed at an angle $\theta 2$ to the horizontal so that shaft 20 and blades 22 present a small incidence to the airflow and thus generates some useful lift. The designed inclination of shaft 20 from the horizontal should be such as to produce only a little more lift than the weight of the rotor assemblies so that the overall net lift contribution which is well behind the wing center of pressure can readily be trimmed out and blade induced drag can be minimized.

Blades 22 should be of tapering planform to reduce stress and possible flutter. Their aerofoil section should be symmetrical. This is because they are feathered when stationary and each blade of the pair should present the same aerofoil to the airstream which they could not do if the aerofoil sections were asymmetric. Aerodynamic efficiency is sought in the fixed wing flight mode for speed and economy so that the floating condition of the blades should be optimized. Autogyro efficiency is less important since it applies only during takeoff and landing phases and need not be efficient. The change in blade angle or pitch at actuation is collective and the system automatically changes the pitch of the blades progressively as shaft 20 tilts from autorotating incidence to fully feathered horizontal aerofoil incidence. Pitch actuation is synchronized with the tilting mechanisms so that autorotation is maintained throughout conversion from autogyro to fixed winged flight. Collective pitch control is well known in helicopter and propeller aircraft and need not be described in detail here.

Figure 7:
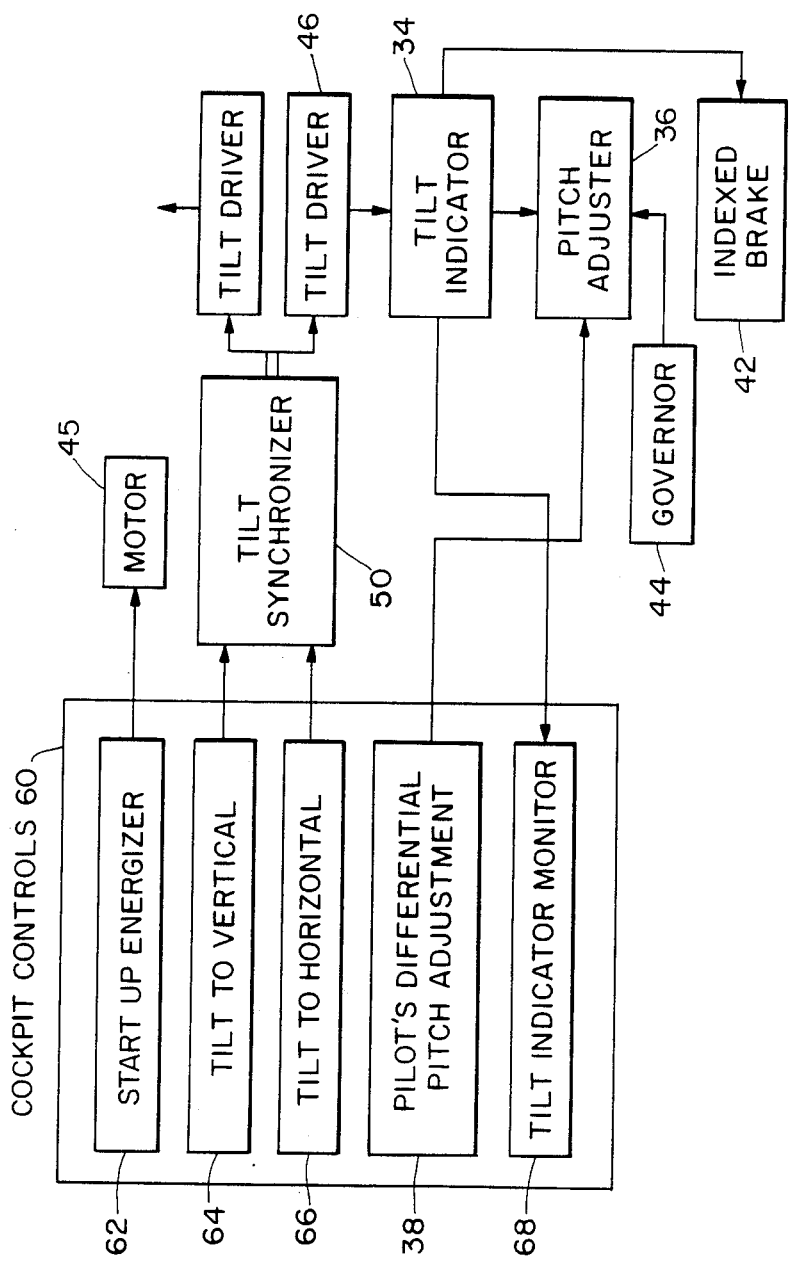
FIG. 7 is a schematic diagram showing the operation of the rotor system according to this invention.

There is shown in FIG. 7 a schematic diagram illustrating the operation of the rotor system according to this invention. Among the cockpit controls 60 are controls for the invention including startup energizer 62 which is used before takeoff to energize rotors 18a', 18b'. Energizer control 62 activates motor 45 which rotates shafts 20 before takeoff until the forward motion induced by the jets of the aircraft results in airflow sufficient to autorotate rotors 18a', 18b'. At that point, motor 45 is automatically or manually disconnected from shafts 20. At takeoff, shafts 20 are in a vertical position. During flight, conversion may be made to wingborne flight mode by activating the tilt to horizontal control 66. This sends a signal to tilt synchronizer 50 which synchronously activates tilt drivers 46, tilt driver 46 which tilts tilt shaft 20 and also causes tilt indicator 34 to activate pitch adjuster 36 to make appropriate changes in blade angle of blades 22a, 22b, 22c and 22d throughout the conversion period. When tilting is complete, tilt indicator 34 activates indexed brake 42 which inhibits rotation of rotors 18a', 18b' so that blades 22a, 22b, 22c, and 22d come to rest in a horizontal position. Throughout autogyro mode and during wing flight, the pilot may circumvent the automatic adjustment of blade angle by use of differential pitch adjustment 38 which directly manipulates pitch adjuster 36 irregardless of the degree of tilt, indicated by tilt indicator 34. The pilot may monitor conversion by watching tilt indicator monitor 68 which is responsive to tilt indicator 34. Pitch adjuster 36 is also responsive to governor 44 which makes further collective pitch adjustments to maintain safe autorotation, especially in the autogyro mode. Conversion from wingborne flight to autogyro mode is initiated by activating tilt to vertical control 64, which causes the synchronous tilt to vertical in the reverse of the horizontal tilt process.

Figure 8:
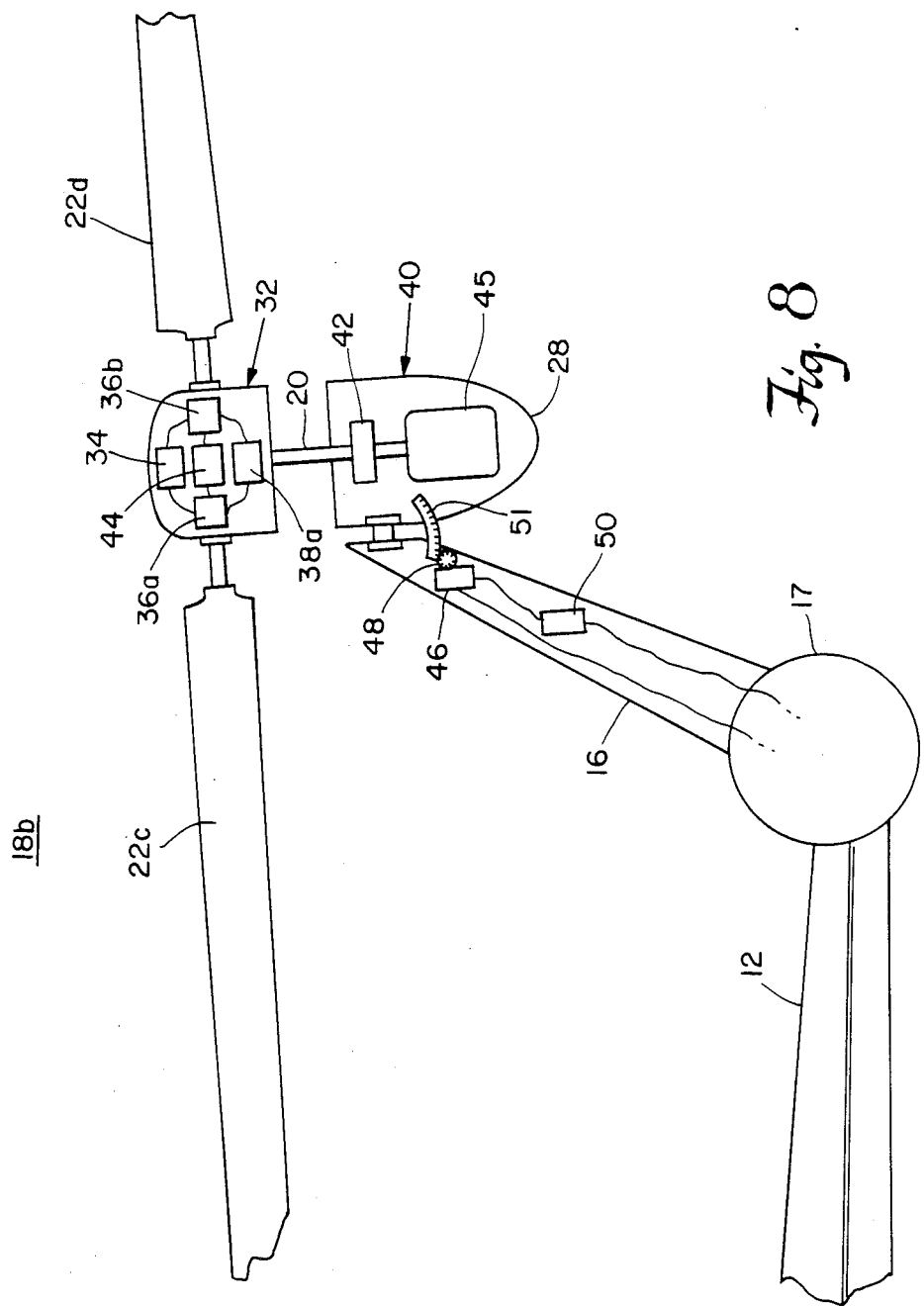
FIG. 8 is a diagrammatic view of a rotor according to this invention mounted on a vertical winglet on the wing of an aircraft not fully shown.

In FIG. 8, rotor system 18b is shown with blades 22c, 22d attached to rotor head 32. Rotor head 32 houses tilt sensor 34 and pitch adjusters 36a, 36b. Pitcher adjusters 36a, 36b adjust the pitch or blade angle of blades 22c, 22d in response to the angle of tilt indicated by tilt indicator 34 and are so designed to obtain autogyro pitch when shaft 20 is in the vertical position and to feather blades 22c, 22d when shaft 20 is tilted to the horizontal position. Rotor head 32 also houses differential pitch actuator 38a which is subject to pilot control and independent of tilt indicator 34 and allows the pilot to bank or turn in autogyro mode making adjustments in pitch or blade angle irrespective of the tilt of shaft 20.

Rotor head 32 also houses pitch governor 44 which makes collective pitch adjustments to maintain safe auto rotation especially in the autogyro mode.

Shaft 20 is rotatably mounted in tilt housing 40. Tilt housing 40 also includes indexed brake 42 which is responsive to the tilting of shaft 20 to inhibit rotation of shaft 20 and rotor 18b' as shaft 20 is tilted toward the horizontal position. Blades 22c, 22d are not rotated to the fixed horizontal position, rather, rotational speed is allowed to decrease as tilt approaches horizontal by increasing pitch to near feathering position. When rotor disk 24b is vertical, blades 22c, 22d are brought to rest in the horizontal plane by application of indexed brake 42. Indexed braking systems are in use in Navy helicopters and are well known in the art and therefore not described in detail here. Indexed brake 42 is sufficient to secure blades in a floating condition because lift and weight forces are substantially balanced and the symmetrical distribution of forces reduces any torque about the brake to a minimum. Brake 42 creates a relatively high drag force progressing between autogyro mode and the horizontal floating mode, but this conversion phase is a very small part of any flight. It is desirable for operational reasons to keep this conversion short, particularly as in the last five to ten degrees of tilt because engine efflux would disturb air flow through the rotor causing vibrations. This could be minimized operationally by converting from vertical position to horizontal position in shallow descent with engines slightly above flight idle.

Pitch or blade angle is actuated progressively in permanent synchronization with the tilt means to ease pilot workload and to provide basic stability and a smooth transition between vertical and horizontal modes. In this way blade pitch is optimized throughout transition between lifting autogyro and fully feathered vertical rotor disk just before rotation is inhibited by brake 42 to bring blades 22c, 22d into rest in a horizontal position in which they attain aerodynamic lift.

Tilt between the vertical and horizontal positions is accomplished by tilt means including tilt driver 46 which drives tilt gear 48. Tilt gear 48 is in working contact with tooth track 51 on tilt housing 40. As gear 48 turns, housing 40 is forced to tilt about tilt axis 30 at which it is pivotably mounted on the winglet 16. Where a plurality of rotors 18 are used on an aircraft, the tilt process is synchronized by tilt synchronizer 50. Finally, tilt housing 40 houses motor 45 which may be an electric motor or pneumatic means to energize the rotors for a few seconds at the start of a takeoff run.

The synchronization of the tilting of the shaft and the automatic blade angle adjustments which are made in response to the degree of tilt may be accomplished by a series of electromechanical motors or by a simpler system of shafts and gears.

At takeoff, the aircraft is in autogyro configuration with shaft 20 in the vertical position blades 22c, 22d in autogyro incidence. After preflight and engine checks, power is supplied slowly and rotors are spun by switching on electric motors or compressed air energizers to drive the rotors until the forward propulsion of the engines creates an airflow sufficient to autorotate the rotors. When this occurs power is then applied fully to the engines and the electric motor or pneumatic means energizing the rotors is switched off manually or is automatically cutoff. When the aircraft has reached takeoff speed, the pilot applies a small elevator pitchoff action which increases the lift generated by the rotors and the aircraft takes off: the pilot takes care not to raise rotor pitch too high or autorotation will decay. Takeoff speed for an aircraft equipped with this invention is much lower than that of conventional aircraft and accordingly it can take off with a much shorter ground run than is ordinarily necessary. When the aircraft is flying, the engine and autogyro controls behave similarly to conventional aircraft although low forward speeds are experienced. The pilot must climb to attain a safe altitude for conversion to purely wingborne flight. This would be altitude from which the aircraft could recover from a stall in a fixed wing configuration. Having attained this altitude, the aircraft levels and accelerates to a speed greater than stalling speed. The conventional control surfaces now become fully effective. The autogyro controls are disconnected when the rotor head governors control rotation. The rotor head governors are set so that the rotors produce low lift and low drag. The aircraft speed is then increased again to maximum transition speed, which is the highest speed at which the autogyro could operate effectively. The range of speeds in which the transition from autogyro to wingborne flight may be accomplished is quite wide: the minimum speed is that speed just above stalling speed and the maximum is just below the maximum forward speed of the autogyro. When all systems have been established, conversion is initiated. Some trim adjustments are required throughout conversion. The pilot monitors conversion by watching the tilting indicators. The final stage of conversion is the indexed braking. When the tilting to horizontal position and the blades are completely stabilized, the aircraft climbs and accelerates to cruising altitude and speed. Rotor tilting is initiated by the pilot at the appropriate speed in a similar way to selecting flap in a conventional aircraft. The tilting action is effected by synchronous electric motors with manual override and standby. Blade pitch is automatically linked to the tilting position of the rotors so that, throughout conversion, blade pitch produces constant auto rotation. Finer pitch adjustments are made by the action of the centrifugal governor in the rotor head to maintain effective auto rotation. Transition from vertical to horizontal position i.e., from rotor borne to wing borne flight, takes place with the rotors up in autogyro blade angle throughout the transition. When the aircraft is fully wingborne, rotor pitch is such as to continue auto rotation but not produce appreciable lift. After the transition to wing borne flight there is a further stage of conversion to fast cruise when the rotors are tilted backwards, the blades have gradually become fully feathered, and the rotor is braked so that the blades are horizontal and attain aerodynamic lift in a floating condition for high speed cruise to which the aircraft can now accelerate.

Similarly, conversion to autogyro mode has to take place before transition from wing borne flight to rotor borne flight. In the conversion from cruise speed or wing borne flight to rotor borne flight, the released rotor brake allows the blades, which have a slight pitch to the fast air stream, to rotate as soon as the rotor shaft becomes exactly horizontal, that is, as soon as it rises from its position from slightly below the horizontal. The effective conversion is like that of an airbrake which should not be deployed at too high a speed. Otherwise, conversion and transition from cruise to landing autogyro is simply the reverse of the procedure described from takeoff to cruise.

Figure 9:
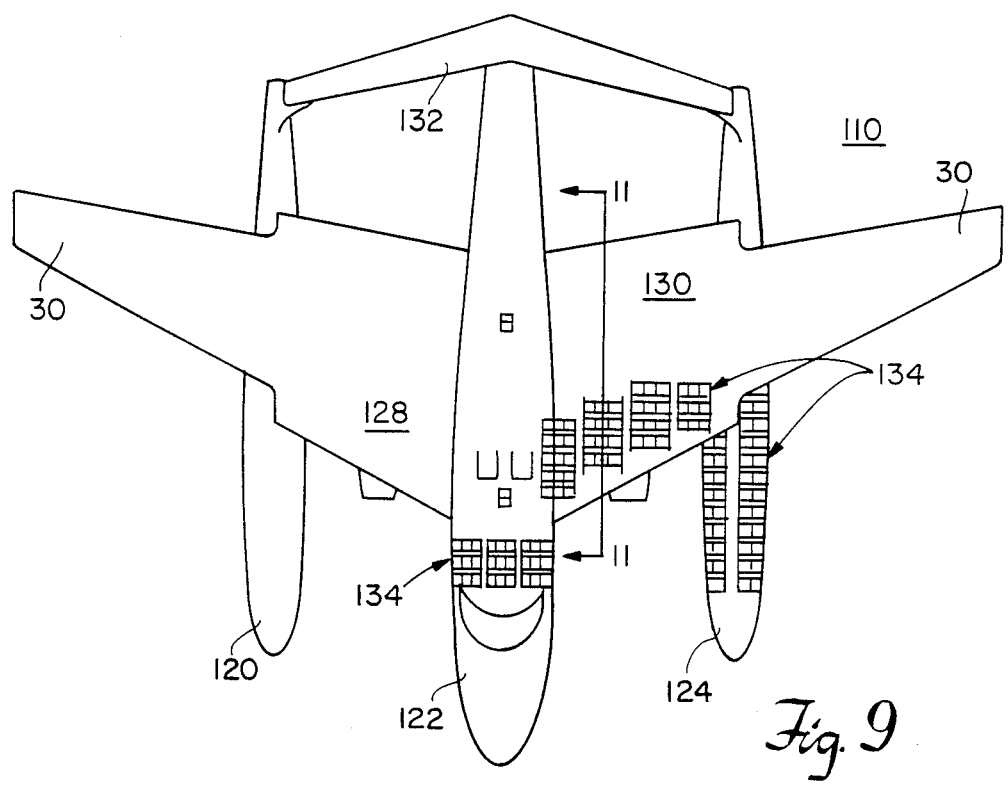
FIG. 9 is a top plan view of single winged multi fuselage aircraft according to this invention.
Figure 10:
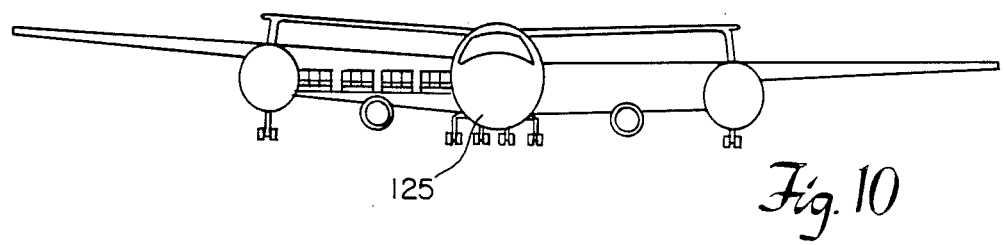
FIG. 10 is a front plan view of the aircraft of FIG. 8.
Figure 11:
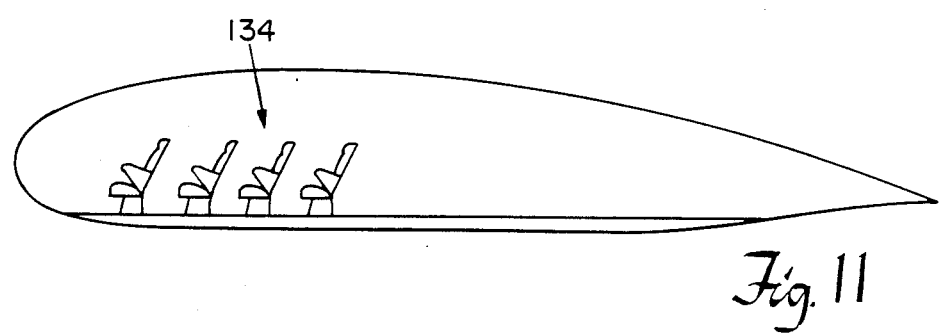
FIG. 11 is a cross sectional view of the wing of the aircraft of FIG. 8 taken along line 10-10.
Figure 12:
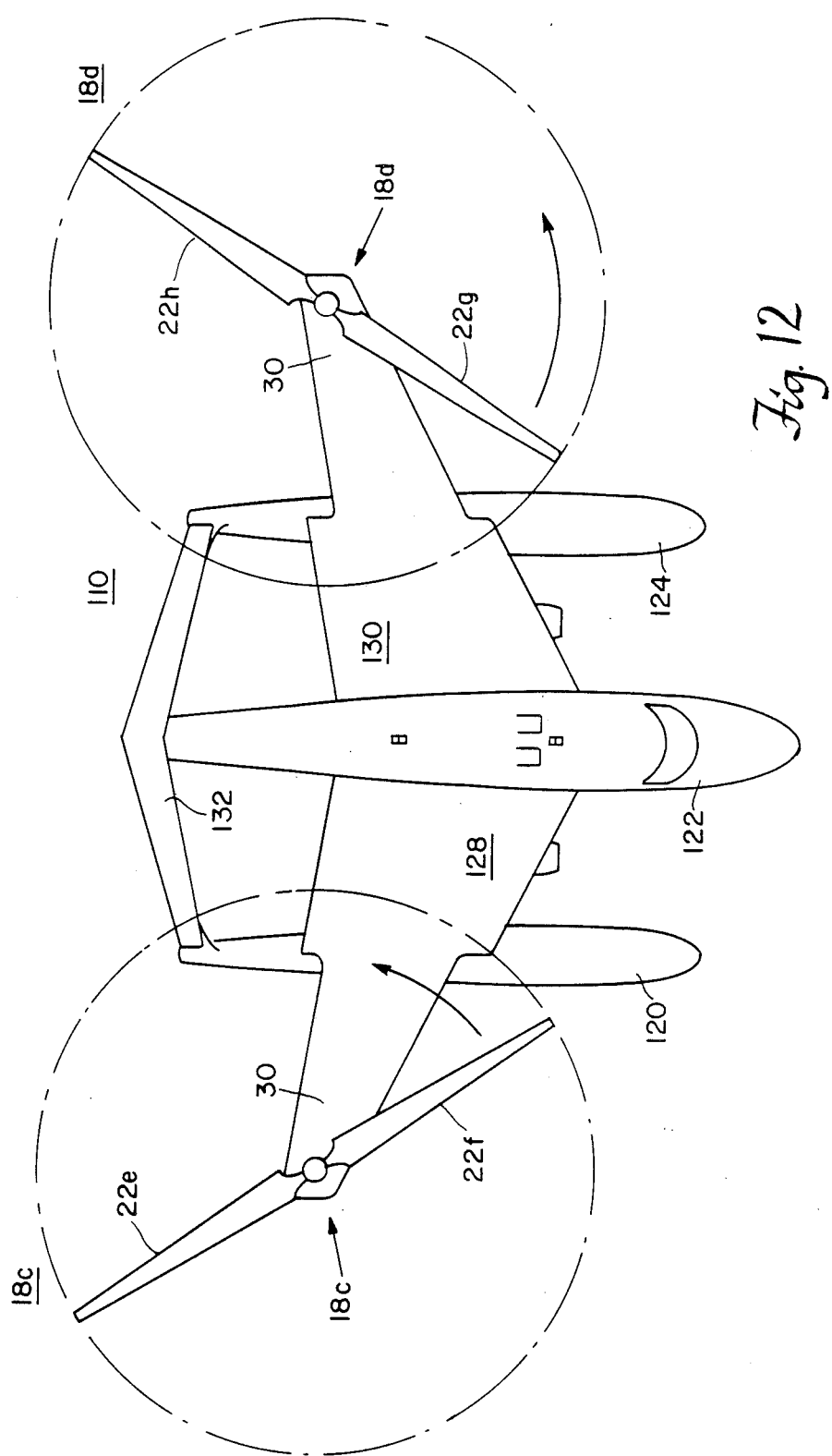
FIG. 12 is a top plan view of the aircraft of FIG. 8 including a rotor system according to this invention.

Turning now to FIGS. 9 to 11, there is shown an aircraft 110 having three hulls 120, 122, 124. The centre hull 122 in turn has an upper cylindrical shell 126 towards the rear and a lower cylindrical shell 125 at the front. Over a central length which largely corresponds with the section where the wing structures 128, 130 linking the three hulls lies, the two shells 126, 125 meet and form a hull section which is of greater depth, so permitting at least two deck levels. A tailwing 132 links all three hulls.

The wing structures 128, 130 are of conventional aerofoil cross-section, but much greater thickness. Thus, as seen in FIG. 11, the space inside is high enough to provide usable deck space to accommodate passenger seating 134, at least over the front half of the cross-section. The structures 128, 130 are also of much larger length in cross-section. Their total area is therefore very large, and together with the conventional wings 30, they provide adequate lift for the three hulls. The span loading characteristic of this design reduces wing stresses, suggesting possible relative structural weight savings.

The passenger seating possibilities are indicated in FIG. 9, and might be as follows:
130 in each of hulls 120, 124;
400 in hull 122;
76 in each wing structure 128, 130.
Total - 812.

The total frontal area of the hulls would be little more than that of a conventional hull accommodating 11 or 12 seat rows, with a total capacity of 350/450 passengers. The possibility of relative structural weight savings combined with relatively lower frontal area drag could bring material benefits in unit operating costs. The aircraft would probably require 4/5 engines.

This multi-fuselage aircraft can also be equipped with the rotor system according to this invention.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. On a fixed winged, jet propelled aircraft, a rotor system for contributing to lift during takeoff and flight comprising:
    a rotatable rotor shaft mounted on one of said wings, said shaft tiltable between a substantially vertical position and a substantially horizontal position;
    a rotor mounted to said shaft, and including at least one blade, said blade having an adjustable blade angle relative to said shaft;
    means for tilting said shaft between said vertical and horizontal positions;
    means, responsive to the tilting of said shaft for automatically adjusting the blade angle of said blade to an autogyro blade angle when said shaft is in said vertical position to lend autogyro lift during takeoff and landing, and to a substantially feathered blade angle when said shaft is in said horizontal position to minimize drag and add aerodynamic lift during wingborne flight.

2. The rotor system of claim 1 wherein said shaft is mounted near the center of lift of said wing.

3. The rotor system of claim 1 further including means for differentially adjusting said blade angle independent of the tilting of said shaft to override said means for automatically adjusting.

4. The rotor system of claim 3 further including means for rotating said shaft before takeoff to energize said rotor.

5. The rotor system of claim 1 further including means for inhibiting rotation of said shaft when said shaft is in said horizontal position.

6. The rotor system of claim 1 wherein said winged aircraft includes substantially horizontal wings having winglets attached to their distal ends, said winglets being angled upward from said wings.

7. The rotor system of claim 6 wherein said shaft is mounted on said winglet.

8. The rotor system of claim 7 wherein said rotor includes at least two blades, each blade being shorter than the wing on which it is mounted.

9. The rotor system of claim 1 wherein said means for tilting includes a tilt driver and a tilt gear.

10. The rotor system of claim 1 wherein said means for automatically adjusting includes tilt indicator means and pitch adjuster means responsive to said tilt indicator means.

11. The rotor system of claim 4 wherein the means for rotating includes an electric motor.

12. The rotor system of claim 4 wherein the means for rotating includes pneumatic means.

13. The rotor system of claim 5 wherein the means for inhibiting includes indexed brake means associated with said shaft.

14. On a fixed winged, jet propelled aircraft, a rotor system for contributing to lift during takeoff and flight comprising:
    one rotatable rotor shaft mounted on each of said wings, said shafts tiltable during flight between a substantially vertical position and a substantially horizontal position;
    a rotor, including at least one blade, mounted on each of said shafts, each said blade having a pitch relative to said wing;
    means for synchronously tilting said shafts between said vertical and horizontal positions;
    means for inhibiting rotation of said rotors when said shafts are in said horizontal position; and
    means responsive to the tilting of said shafts, for automatically adjusting the pitch of each said blade so that said blades lend lift when said shafts are in said vertical position during takeoff and landing, and said blades are substantially feathered when said shafts are in said horizontal position during wingborne flight to attain aerodynamic lift.

15. The rotor system of claim 14 further including means for differentially adjusting the pitch of said blades independent of the tilting of said shaft to override said means for automatically adjusting.

16. The rotor system of claim 14 wherein said rotor shafts counter rotate to provide improved balance.

17. The rotor system of claim 16 wherein the outboard blades of said rotors advance in the direction of travel.

18. The rotor system of claim 14 wherein said means for synchronously tilting includes a tilt synchronizer for synchronizing the tilting of said shafts, and a tilt driver and tilt gear associated with each said rotor, said tilt drivers responsive to said tilt synchronizer.

19. The rotor system of claim 14 wherein said means for inhibiting includes indexed braking means, for inhibiting the rotation of said shafts, associated with each said shaft.

20. The rotor system of claim 14 wherein said means for automatically adjusting includes tilt indicator means and pitch adjustor means responsive to said tilt indicator means.

21. The rotor system of claim 1 installed upon an aircraft having more than one fuselage linked by a wing structure providing lift, wherein the fuselages and the wing structure house payload space.

* * * * *